United States Patent [19]

Bottiau

[11] Patent Number: 4,628,304

[45] Date of Patent: Dec. 9, 1986

[54] SYSTEM FOR GENERATING TRICOLOR VIDEO SIGNALS, SUCH AS A GAME, AND A REMOVABLE CARTRIDGE INTENDED FOR SUCH A SYSTEM

[75] Inventor: Michel Bottiau, Maurepas, France

[73] Assignee: U.S. Philips Corporation, New York, N.Y.

[21] Appl. No.: 479,597

[22] Filed: Mar. 28, 1983

[30] Foreign Application Priority Data

Sep. 14, 1982 [FR] France ................... 82 15532

[51] Int. Cl.[4] ............................................. H04N 7/00
[52] U.S. Cl. ........................... 340/703; 273/DIG. 28; 340/745
[58] Field of Search ....................... 340/721, 728, 745; 273/DIG. 28, 1 E, 85 G

[56] References Cited

U.S. PATENT DOCUMENTS 4,209,832  6/1980  Gilham et al. ................... 340/721
4,352,492 10/1982  Smith ........................... 273/DIG. 28
4,393,376  7/1983  Thomas ......................... 340/700
4,486,779 12/1984  Marti ........................... 340/721

Primary Examiner—Leo P. Picard
Attorney, Agent, or Firm—Thomas A. Briody; Jack Oisher; William J. Streeter

[57] ABSTRACT

A system for generating color video signals, such as a game and a removable cartridge intended for such a system. Signal generating system comprising a storage cartridge (1), manual control (2), a data handling microprocessor (3), a main generator (4) for generating a synthesized picture and producing color signals R, V, B in the form of quantized values and producing synchronizing signals S together defining a main picture. Added to the main generator (4) is an additional generator (6) which is synchronized by S and produces the signals $R_1$, $V_1$, $B_1$ which form an additional background picture in synchronism with the main picture. Portions of the main picture are replaced by complementary portions of the additional image by means of a selection device (19) when the portions of the main picture have a color which is identical to the color stored in a register (7).

6 Claims, 4 Drawing Figures

SYSTEM FOR GENERATING TRICOLOR VIDEO SIGNALS, SUCH AS A GAME, AND A REMOVABLE CARTRIDGE INTENDED FOR SUCH A SYSTEM

BACKGROUND OF THE INVENTION

The present invention relates to a system for generating color video signals, such as a video game, comprising a source for supplying stored digital data, manual control means, a device for handling data produced by said means, and a generator generating synthesized pictures supplying the color signals R, V, B (R, G, B) in the form of quantized values as well as the field and line synchronizing signals, these signals being intended to form a picture on a screen from the data conveyed by the data handling device.

The invention has particularly, but not exclusively, for its object to provide so-called "video games" which are designed for connection to a color television receiver, either to the aerial input or to a special socket for the composite video input, the so-called "auxiliary input" with which many color-TV receivers are equipped at present.

The invention has also for its object to provide a video game which has its own display screen and more in general all types of picture generators whose color components R, V, B are produced at quantized levels and whose structures answers the definition given in the opening paragraph.

The invention also relates to a removable cassette intended to provide said digital data source in a video signal generating system. Systems of the above type are used inter alia for video games that are organized in accordance with the above-mentioned structure, based on the use of a generator generating synthesized pictures and designed exclusively for this use and producing the signals which are necessary to form a picture whose moving or stationary components are part of the picture subassemblies organized in accordance with a hierarchical order of possible modes. Thus, a picture subassembly will, for example, be reserved for stationary or quasi-stationary images (background color, lines defining a game area) while at least one further picture subassembly is capable of showing movable images on the screen, of detecting collisions between images, etc.

Consequently, this highly specialized generator for generating synthesized pictures is, after all, a very complicated element because of the nature of the functions it must perform. Therefore, up to the present and more specifically for reasons of economy, only pictures whose composition is very simple and which actually show only functional images which move in a rather rudimentary setting are displayed on the screen.

The degree to which these pictures appeal to the user leaves much to be desired in particular insofar as they deviate from natural scenes.

SUMMARY OF THE INVENTION

The present invention has for its object to provide a system for generating improved color video signals, more specifically a video game which is capable of producing pictures of a greatly improved composition, especially as regards the setting, the generating system in accordance with the invention being inter alia designed to be compatible with prior art systems, of which it is an improved version.

According to the present invention, a system for generating color video signals, such as a video game, comprising at least a source for supplying stored digital data, manual control means, a device for handling data supplied by the aforementioned means and a generator for generating synthesized pictures supplying in the form of quantized values the color signals R, V, B as well as field and line synchronizing signals, these signals being intended to form a picture on a screen from the data conveyed by the data handling device, is characterized in that the generator for generating synthesized pictures as the main generator is associated with an additional generator for generating synthesized pictures in synchronism with the main generator and producing the signals $R_1$, $V_1$, $B_1$ for forming an additional picture which in all respects is synchronous with the picture produced by the main generator, said system comprising inter alia a storage register for storing at least one predetermined color code from the possible combinations of the signals R, V, B, a selection device provided by a set of selection gates for choosing between the set of signals R, V, B, and the set of signals $R_1$, $V_1$, $B_1$ this set of gates being controlled by a comparator, a first input of which comprises a decoder for the signals R, V, B and to a second input of which the signal supplied by the storage register is applied, so that the set of selection gates replaces in a picture point the values R, V, B defined by the main generator with the values $R_1$, $V_1$, $B_1$, as defined by the additional generator, in the event that said predetermined color and the color defined at that moment by the set of signals R, V, B are identical at the inputs of the comparator.

Thus, the system for generating video signals in accordance with the invention comprises two generators for generating synthesized pictures, each producing at that moment and in the same manner the signals which are necessary to form the two pictures: a main picture comprising, for example, the functional images known from the prior art, and an additional picture which forms, for example, a background setting whose composition may be as detailed as desired. For this it is sufficient to choose an additional generator for generating synthesized pictures whose possibilities are in keeping with the object to be accomplished. A first feature of the system in accordance with the invention is the possibility to differentiate between the functional characteristics of the pictures produced by the main picture generator and the additional picture generator, the main generator having, for example, for its object to produce the movable images, while the additional generator produces only the stationary or quasi-stationary images, (that is to say the images which are not capable of having moving details but which can disappear suddenly and reappear in a different shape) while, in contrast therewith the additional picture may be defined by a larger number of colors and/or with finer contours. This has an advantage that it is possible to adapt the structure of the additional synthesized-picture generator, which may be non-dedictated and therefore inexpensive, to the required visual result.

According to the invention, the video signals produced by the system result from combining the picture elements which come partly from the main picture generator and partly from the additional picture generator, the latter case occurring when, at a given moment the colors defined by the signals R, V, B produced by the main picture generator and a predetermined color which may be chosen optionally and which has been stored in digital form in the storage register, are perfectly identical.

The general problem of how to cut windows in a background picture, in which windows the elements of a different picture must be incorporated, has already been studied and techniques based on the analysis of the colors of one of the picture and the recognition of a certain shade of this picture to define the contour of the window to be cut are already known. It should however be noted that the system in accordance with the invention belongs to a class of apparatus which utilize technical means of considerably smaller dimensions than the class of studio apparatus intended for natural pictures for which known techniques are used.

In the first place it should be noted that the signal generating system concerned here generates signals R, V, B as quantized values and that consequently the number of colors supplied by the combination of the signals is very limited. The fact that these colors are defined by digital values renders it possible to employ the considerably simpler solution according to the invention for the selection of the elements of the additional picture, a solution which restricts itself in essence to the use of a storage register, a comparator and a set of gates. In the second place, the system according to the invention provides the possibility, without the need for any additional circuitry, to designate more than one single color to the main picture elements which will be considered as being transparent during operation, that is to say, it allows the passages of the corresponding portions of the additional picture. It is then sufficient to enter only the desired number of colors which must behave as "transparencies" during operation into the storage register.

A further advantage of the system according to the invention is that it makes possible widely varying combinations between the elements of the two pictures, which combinations can develop during operation as it is possible to modify the, color or colors designated as "transparencies", by simply changing the content of the storage register. In this connection one possible example is the case in which an image of the additional picture is masked by an other image of the main picture because of the fact that the color of this other image has not been chosen as a "transparent" color while the next moment the image of the additional picture appears because of the sole fact that the designation of the "transparent" colour within the storage register has been modified.

Further important advantages of the system according to the invention result from the fact that it provides optimal compatibility with prior art systems and system elements. Actually, when the system is, for example, a video game, it is possible to assign to the generator generating the main synthesized picture, those picture portions which are absolutely necessary to understand the game, while the additional generator for generating the synthesized picture produces only the additional elements which provide the background setting. It is therefore easily accomplished that the novel system according to the invention is compatible with prior art digital data sources (programmable storage cartridges) which produce pictures without additional background setting. On the other hand the principal portion of the logic circuit concerning pictures such as produced by the prior art systems can be used without modifications.

In accordance with a preferred embodiment of the invention, the signal generating system is characterized in that the additional generator for generating a synthesized picture comprises at least an additional programmable memory in which the digital data defining the composition of the additional image from said digital data source can be stored by means of said data handling device.

If this is accomplished in such a way that said programmable memory is loaded in a first period of time during the course of operations, it is then possible to handle only the data relating to the main generator for generating the synthesized picture. It is therefore very easy to make the system according to the invention compatible with prior art data sources (game cartridges). Obviously, no data intended for the additional generator are available in such a source, and the novel system will function like the prior art system producing the same pictures.

In accordance with a further embodiment of the invention, the selection device further comprises an enable input enabling the choice between the set of signals R, V, B and the set of signals $R_1$, $V_1$, $B_1$, which enable input is connected to an enable terminal of said digital data source.

The present invention also relates to a removable cartridge which is to form the digital data source in the system defined in the foregoing, which cartridge is characterized in that a portion of the digital data contained therein is to be transferred to the additional programmable memory associated with the additional generator for generating a synthesized picture.

It has the advantage that the digital data intended for the additional generator for generating a synthesized picture may be different from cartridge to cartridge, in such a way that the additional picture is adapted at will to the main picture produced by data contained in the same cartridge.

Advantageously, said digital data stored in the memory comprise inter alia a digital word defining said predetermined color or colors, which word is to be conveyed to the storage register. Thus, all the specific digital data of an operating sequence, for example a game, are concentrated in the cartridge and provide a set of data which are functionally homogeneous and may be adapted to the anticipated sequence.

In another embodiment of the invention, the removable cartridge comprises an enable terminal for an enable output signal indicating at a predetermined moment during operation that a portion of the digital data stored in the source is to be transferred to the additional programmable memory which is associated with the additional generator for generating a synthesized picture.

DESCRIPTION OF THE DRAWINGS

Further particulars, details and advantages will become evident from the following description which is given by way of non-limitative examples with reference to the accompanying drawings.

DESCRIPTION OF THE PREFERRED EMBODIMENT

Figure 1:
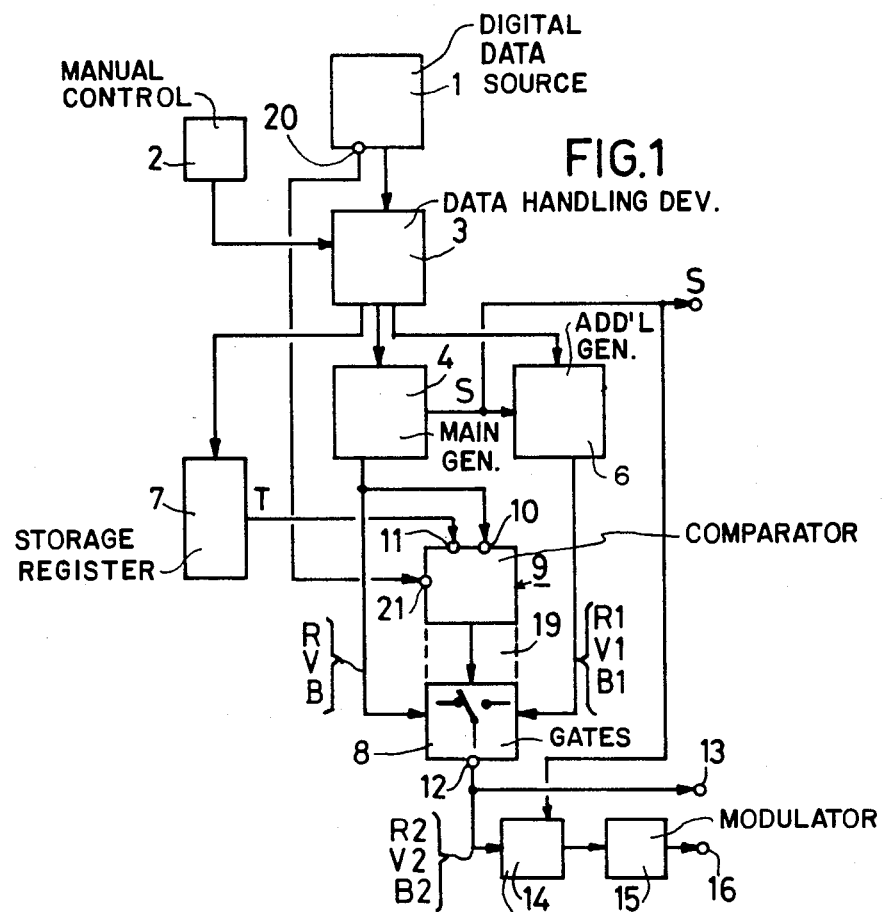
FIG. 1 shows a schematic block diagram of a system for generating signals according to the invention.

Referring to FIG. 1, the system is primarily comprised of a digital data source 1 whose data are stored in, for example, a programmable memory, manual control means 2, which, for a game are provided by e.g. pushbuttons and multi-directional control levers for the players, a data handling device 3 for handling more specifically data supplied by the source 1 and the manual control means 2, the device 3 being in practice a microprocessor. In addition, the system comprises a main generator 4 for generating a synthesized picture, which generator is in the form of an integrated circuit specially designed for incorporation in a video game. The main picture generator 4 generates field and line synchronizing signals S and also three primary color signals R, V, B, adapted to form a picture on a screen, which picture will be denoted as the main picture hereinafter. These signals may be used directly, if the screen is part of the system itself, or when a television set is used having an R, G, B input terminal (auxiliary input), or indirectly for use of the aerial terminal of a television set, the signals then being modulated on a carrier in a way which is known per se.

The circuit portion described so far also holds for the prior art systems. At present, video games of this construction are widely used; it is therefore not necessary to give a more detailed description as they are well known to a person skilled in the art.

The signal generating system of FIG. 1 comprises inter alia an additional generator 6 for generating a synthesized picture, which produces the signals $R_1$, $V_1$, $B_1$ to provide an additional picture which is fully synchronized with the main picture. For that purpose the additional generator 6 is synchronized with the main generator 4 by means of synchronizing signals S.

The system also comprises a storage register 7, for storing at least one predetermined color code defining one of the possible combinations of the signals R, V, B. The corresponding digital data are transmitted by the data handling device 3 at the beginning of an operating cycle but, as mentioned already in the foregoing, this digital data may be subject to modification during the cycle of operation in connection with a specific event.

FIG. 1 further shows a set of gates 8, which provide the selection between the set of signals R, V, B produced by the main generator for generating a synthesized picture, and the set of signals $R_1$, $V_1$, $B_1$ produced by the additional generator 6 for generating a synthesized picture. The set of gates is controlled by a comparator 9, whose input 10 is provided with a decoder for decoding the signals R, V, B applied thereto, while, to the other input 11 of the comparator 9 a signal T representing the predetermined color or colors, is supplied by the storage register 7. The combination of the set of gates 8 and the comparator 9 forms the selection device 19.

The video signal generating system of FIG. 1 operates in such a way that at a point of the picture, the signals R, V, B as defined by the main generator are replaced by signals $R_1$, $V_1$, $B_1$ as defined by the additional generator each time the signal T representing said predetermined color and the color of the main picture defined at that momemt by the set of signals R, V, B, are identical. The set of gates 8 provides this replacement in response to the control signal produced by the comparator 9. At the output 12 of the set of gates 8, signals $R_2$, $V_2$, $B_2$ are then produced forming a composite picture in which one or more portions of the pictures as produced by the main picture generator 4 are replaced by corresponding portions of the additional picture if and when such portion of the main picture contains a so-called "transparent" color as stored in the storage register 7.

The signals $R_2$, $V_2$, $B_2$ can be taken from the output 13 of the system for direct use in combination with the synchronizing signals S. It is alternatively possible to apply these signals to matrixing and color coding circuits 14, which are followed by a modulator 15 (UHF or VHF) so that an output 16 may be connected to the aerial input of a television set.

As shown schematically in FIG. 1, the digital data source 1 comprise advantageously an enable output terminal 20 connected to the enable input 21 of the comparator 9. At predetermined moments during operation, there appears at the terminal 20 an output signal which is applied as an additional condition to an enable input 21 of the comparator 9. This comparator 9 does not apply a control signal to the set of gates 8 for the selection of the signal $R_1$, $V_1$, $B_1$ until this additional condition has been obtained. This enable signal at the terminal 20 of the source 1 is an indication that among the digital data contained in the source 1, there is a portion which is to be transferred to an additional programmable memory which is associated with the additional picture generator 6. Actually, the system might also be used with a prior art digital data source comprising only data intended for the main generator 4, the additional generator 9 remaining inactive in this hypothetical case. In that case no enable signal is present, so that the set of gates 8 are kept in the state in which they provide signals R, V, B only. In this way compatible operation of the system is ensured for the case that the system is used in combination with a prior art data source.

Figure 2:
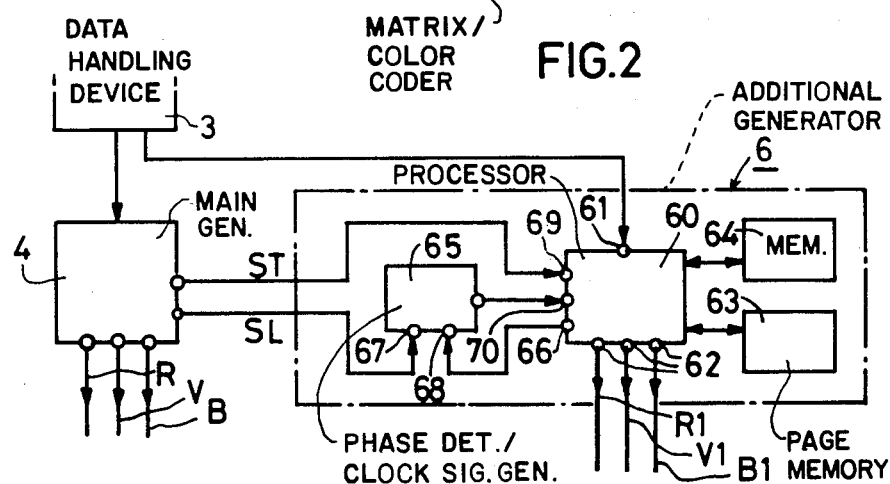
FIG. 2 shows a more detailed block diagram of the part of the system which relates to the principal and additional generators for generating a synthesized picture.

FIG. 2 shows in a more detailed block diagram the functions of the additional synthesized picture generator 6 of FIG. 1 in relation to the main generator 4. The additional picture generator 6 comprises a specialpurpose processor 60, which at its terminal 61 receives the data supplied by the data handling device 3 and produces the signals $R_1$, $V_1$ and $B_1$ at its three outputs 62.

In the example described, the processor 60 produces coded signals for displaying up to screen characters twenty-five rows of forty characters on a screen. The processor 60 contains its own read-only memory which is preloaded in such a way that standard graphic and/or alpha-numerical characters are obtained, more specifically such symbols as used in the display of video texts, the processor 60 having been programmed for this use. The FIG. 2 shows a first read/write memory 63 called page memory, which is associated with the processor 60 in which character codes are loaded on memory-addresses corresponding to screen-positions to which the processor 60 must refer in order to form the additional picture as a composition of characters. These charcters are represented as e.g. a character identification-byte and an attribute-byte (color of the character, color of the background etc). A second read/write memory 64 comprises preferably the definition of special digital codes defining the desired additional picture element by element. These special codes are also generated in the form of signals $R_1$, $V_1$, $B_1$ at the output terminal 62 of the processor 60. Loading the memories 63 and 64 is effected on the basis of the data comprised in the source 1 and the data are transmitted via the data handling device 3.

A clock signal from a quartz clock operating at approximately 3.5 MHz and whose frequency is adjustable via a diode, the capacitance of which varies in response to a phase comparison is applied to the input 70 of the processor 60. This circuit assembly is represented by the device 65, which consequently also comprises a phase comparator connected to its input 67 and 68.

A signal of the video line-frequency, produced by the processor 60 from the terminal 66 is compared with the line synchronizing signal SL produced by the main picture generator 4, these signals being applied to the terminals 68 and 67, respectively. The phase difference analyzed by the device 65 is converted into a voltage which is applied to the variable capacitance diode so that the line-frequency signal supplied by the terminal 66 is equal to the frequency of the signal SL. This type of phase-locked loop oscillator is well known to a person skilled in the art, so that a more detailed description is not necessary. The processor 60 comprises a field synchronizing input 69 to which the field synchronizing signal produced by the main picture generator 4 is applied. Thus, the signals $R_1$, $V_1$, $B_1$ produced by the additional picture generator 6 are in synchronism (field and line) with the signals produced by the main generator 4, using its own clock signal generator. It should finally be noted that a generator such as the one described above, by way of example, which acts as the additional generator 6 for generating a synthesized picture may be implemented by using commercially available circuits, such as the integrated circuits EF 9340 and EF 9341.

Figure 3:
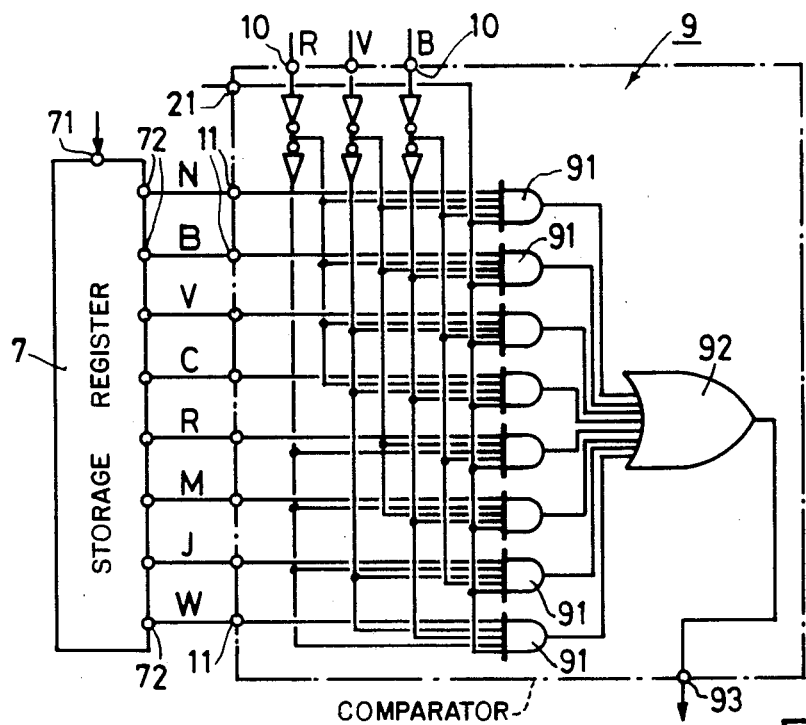
FIG. 3 illustrates a detailed example of that part of the system of FIG. 1, which relates to the comparator and the storage register.

FIG. 3 shows an embodiment of the comparator 9 of FIG. 1 comprising a multiplexer having eight inputs plus three selection inputs and an enable input.

The storage register 7 is loaded via its input 71 with a digital code which causes at the occurrence of a socalled "transparent" color, that the output signal at the output 72 which is adjusted to "ON". In our example the possible color are: black (N), blue (B), green (V), cyan (C), red (R), magenta (M), yellow (J) white (W), which are the eight possible combinations of two-level signals R, V and B.

Each output 72 of the storage resistor 7 is connected to a corresponding input 11 of the comparator. The latter has three additional inputs 10 for the signals R, V and B, and the enable input 21. The signals which are available in parallel at the inputs 10, are thereafter decoded by applyng them to the inputs of the eight AND-gates 91. Thus, when the color code at the inputs 11 and the color defined at that instant by the set of signals R, V, B at the input 10 are identical, one of the gates 91 produces an "ON"-signal which is presented via on OR-gate 92, to an output 93 of the comparator 9. Thereby an "ON"-signal appears at this output 93 enabling the selection of the signals $R_1$, $V_1$, $B_1$ via the set of gates 8. Moreover, the "ON"-signal at the output 93 is only supplied when an "ON"-signal is also present at the enable input 21, this input being connected to the terminal 20 of the digital data source 1 as has already been described with reference to FIG. 1.

Figure 4:
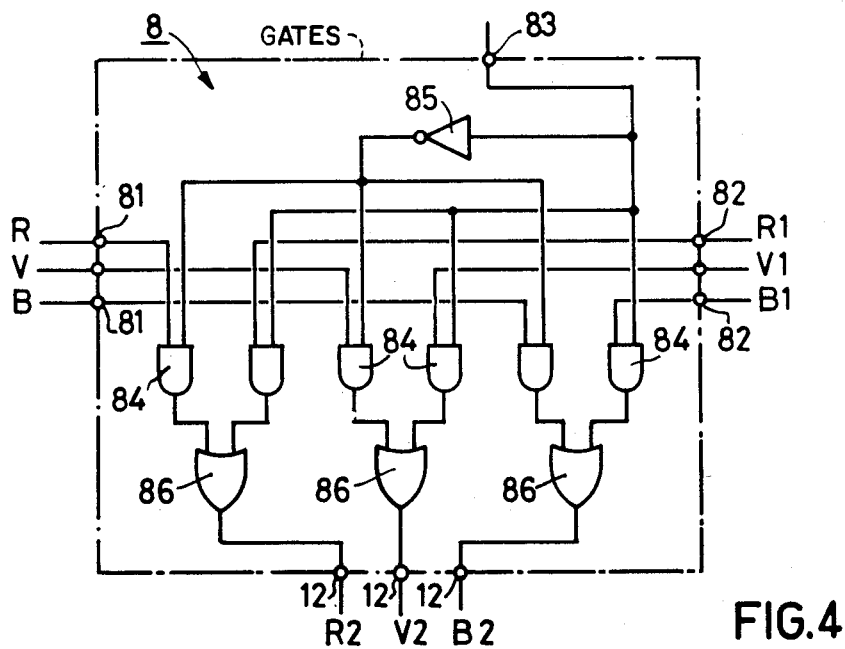
FIG. 4 shows an example of a set of selection gates.

FIG. 4 shows an implementation of the set of gates 8. This implementation comprises inputs 81 for the signals R, V, B and further comprises inputs 82 for the signals $R_1$, $V_1$, $B_1$ and a control input 83 connected to the output 96 of the comparator 9 (see FIG. 3). The inputs 81 and 82 are connected to first inputs of each one of the six AND-gates 84, while the selection control signal is supplied to the second inputs of three of the six gates 84, and via an inverter 85 the inverted control signal is supplied to the second inputs of the other three gates 84. The outputs of the gates 84 are connected, pair-wise, to the OR-gates 86, which apply to the output 12 the signals $R_2$, $V_2$, $B_2$ obtained from the signals R, V, B partially replaced by the signals $R_1$, $V_1$, $B_1$ in response to the control signal applied to the input 83 corresponding to certain portions of the main picture.

Obviously, the above-described example is given by way of illustration and several variations may be conceived, more specifically as regards the number of colors used and the means used to realize the invention. Thus, a two-state luminance signal superimposed on the signals R, V, B and/or the signals $R_1$, $V_1$, $B_1$ can be provided without difficulties to upgrade the composite picture. When this luminance signal plays a part in the definition of the main picture, it is simple to have it also play a part in the definition of the socalled "transparent" colors, if so desired, by adding a digital path to the storage register 7, to the comparator 9 and to the set of gates 8.

On the other hand, the enable input 21 of the comparator 9 may in a similar manner be replaced by an enable gate arranged between the output 93 of the comparator and the input 83 of the set of selection gates 8. It should be noted that the change in state of the selection device 19 is obtained with a short delay with respect to change in the R, V, B-signals which cause the selection. This delay is caused by the propagation time of the signals through the successive gates of the selection device 19.

Although this delay is so short that its effects are hardly visible on the screen, it can be easily compensated for by arranging at the inputs 81 and 82 of the set of gates 8 (FIG. 4) additional logic components (for example an even number of inverters in series) submitting the incoming signals R, V, B and $R_1$, $V_1$, $B_1$ to a delay substantially equal to the delay produced by the selection device 19.

In the event that the system is a video game the digital data source 1 is a removable cartridge containing a read-only memory or a tape-cassette. This cartridge can be compatible with prior art cartridges and therefore with prior art systems. If a prior art game cartridge is used with a system according to the invention, this will produce the pictures from the main picture generator 4 only. The additional picture generator 6 will remain inoperative. Besides the fact that the storage register is not loaded in that case, the prior art cartridge will usually not comprise a terminal 20 to supply any selection signal to the selection device 19 which remains inoperative. The system supplies only the signals R, V, B. Correspondingly, if a cartridge according to the invention is used in a prior art system (which does not comprise an additional picture generator), the digital data intended for storage in the additional programmable memory associated with the additional generator remain unused, and such a combination will produce pictures defined by R, V, B only. Thus compatibility between systems according to the invention and prior art systems results in a great versatility.

On the other hand, the means used to realize the invention are comparatively simple so that they can be included at a moderate price.

What is claimed is:

1. A system for generating color video signals comprising:

a source for storing and supplying digital data;

a device for processing digital data coupled to an output of said source;

manual control means coupled to said processing device for the control thereof; and a generator coupled to a first output of said processing device for generating color signals R, V, B in the form of a range of quantized values, and field and line synchronizing signals, these signals forming on a screen a picture from the digital data supplied by said source; wherein said system further comprises:

an additional generator coupled to a second output of said processing device for generating color signals $R_1$, $V_1$, $B_1$, for forming on said screen an additional picture, said addition generator also being coupled to said generator for receiving said field and line synchronizing signals so that said additional picture is synchronous with the picture formed on said screen by said generator;

a storage register coupled to a third output of said processing device for storing at least one predetermined color code corresponding to a combination of values in said range of values of the color signals R, V, B;

a selection device coupled to an output of said generator and an output of said additional generator, said selection device including a set of selection gates for selectively applying the signals R, V, B and $R_1$, $V_1$, $B_1$, respectively, to an output thereof; and a comparator having a first input comprising a decoder to which the signals R, V, B are applied, a second input coupled to an output of said storage register, and an output coupled to a control input of said set of selection gates, whereby said selection gates apply the signals $R_1$, $V_1$, $B_1$ generated by the additional generator to the output thereof instead of the signals R, V, B generated by said generator, each time said predetermined color code supplied by said storage register and the signals R, V, B generated by said generator and decoded by said decoder are identical.

2. A system as claimed in claim 1, wherein the additional generator for generating a synthesized picture comprises at least an additional programmable memory in which the digital data defining the composition of the additional picture from said digital data source can be stored by means of said data processing device.

3. A system as claimed in claim 1 or 2, wherein the selection device further comprises an enable input means enabling the choice between the set of signals R, V, B and the set of signals $R_1$, $V_1$, $B_1$, said enable input means being connected to validation terminal means of said digital data source.

4. A system as claimed in claim 2, wherein said digital data source comprises a removable cartridge and a portion of the digital data contained therein is transferred to the additional programmable memory associated with the additional generator for generating a synthesized picture.

5. A system as claimed in claim 4, wherein said digital data comprises inter alia a digital word defining said predetermined color code, said digital word being conveyed to the storage register.

6. A system as claimed in claim 4 or 5, wherein said cartridge comprises an enable terminal coupled to an input of said additional generator for applying an enable output signal thereto indicating, at a predetermined moment during operation, that a portion of the digital data contained in the source is to be transferred to the additional programmable memory in the additional generator for generating a synthesized picture.

* * * * *